United States Patent
Fujiyama (10) Patent No.: US 12,546,733 B2
(45) Date of Patent: Feb. 10, 2026

(54) CELL EVALUATION DEVICE

(71) Applicant: SHIMADZU CORPORATION, Kyoto (JP)

(72) Inventor: Yoichi Fujiyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 830 days.

(21) Appl. No.: 17/608,523

(22) PCT Filed: May 1, 2020

(86) PCT No.: PCT/JP2020/018472
§ 371 (c)(1),
(2) Date: Nov. 3, 2021

(87) PCT Pub. No.: WO2020/226149
PCT Pub. Date: Nov. 12, 2020

(65) Prior Publication Data
US 2022/0229001 A1    Jul. 21, 2022

(30) Foreign Application Priority Data
May 8, 2019  (JP) .................................. 2019-088562

(51) Int. Cl.
G01N 27/04      (2006.01)
C12M 1/00       (2006.01)
C12M 1/32       (2006.01)

(52) U.S. Cl.
CPC ............. *G01N 27/04* (2013.01); *C12M 23/12* (2013.01); *C12M 23/38* (2013.01); *C12M 43/00* (2013.01)

(58) Field of Classification Search
None
See application file for complete search history.

(56) References Cited

U.S. PATENT DOCUMENTS 5,112,574 A * 5/1992 Horton ................ B01L 3/50853
                                              422/942
6,193,088 B1 * 2/2001 Vincent .................. C12M 37/02
                                              215/261
(Continued)

FOREIGN PATENT DOCUMENTS

JP    2001-108647 A    4/2001
JP    2009-0523448 A   6/2009
(Continued)

OTHER PUBLICATIONS

Translation of JP-3180743-U, Mar. 26, 2015 (Year: 2015).*
(Continued)

*Primary Examiner* — Henry H Nguyen
(74) *Attorney, Agent, or Firm* — Sughrue Mion, PLLC (57) ABSTRACT

The cell evaluation device includes a cell housing unit 111, and an adapter 120 configured to be elastically deformed by being fitted into the cell housing unit to close a top opening of the cell housing unit, and the adapter includes a body 121 to be inserted into the cell housing unit, a positioning unit 122 configured to position the body in a vertical direction with respect to the cell housing unit, a culture medium inlet port 124 and a culture medium outlet port 125 penetrating the top end and the lower end of the body, and a flexible sheet member 123 which is provided on a lower end of the body and extends radially outward from an outer edge of the lower end. This makes it possible to prevent leakage of the culture medium in the cell evaluation device.

6 Claims, 3 Drawing Sheets

(56) References Cited

U.S. PATENT DOCUMENTS

| | | | | |
|---|---|---|---|---|
| 2003/0186217 A1* | 10/2003 | Bader | .................... | C12M 23/24 |
| | | | | 435/287.1 |
| 2004/0039417 A1* | 2/2004 | Soykan | ................. | A61N 1/326 |
| | | | | 607/2 |
| 2004/0115096 A1* | 6/2004 | Itoh | .................... | B01L 3/50825 |
| | | | | 422/400 |
| 2007/0166817 A1 | 7/2007 | Wilkes et al. | | |
| 2012/0295343 A1* | 11/2012 | Bear | ...................... | C12M 23/38 |
| | | | | 422/568 |
| 2015/0218501 A1* | 8/2015 | Kauling | ................. | C12M 29/20 |
| | | | | 435/325 |
| 2017/0146473 A1* | 5/2017 | Groeber | ............. | G01N 33/4833 |
| 2018/0127698 A1* | 5/2018 | Niggemann | ........... | C12M 23/12 |
| 2019/0382703 A1 | 12/2019 | Katayama et al. | | |

FOREIGN PATENT DOCUMENTS

| | | | |
|---|---|---|---|
| JP | 3180743 U | * | 1/2013 |
| JP | 3196673 U | | 3/2015 |
| KR | 10-2017-0112395 A | | 10/2017 |
| WO | 2018/079793 A1 | | 5/2018 |

OTHER PUBLICATIONS

International Search Report of PCT/JP2020/018472 dated Jun. 16, 2020 [PCT/ISA/210].
Written Opinion of PCT/JP2020/018472 dated Jun. 16, 2020 [PCT/ISA/237].
Chinese Office Action dated Dec. 11, 2023 in Chinese Application No. 202080029900.2.
Chinese Office Action issued Apr. 26, 2024 in Application No. 202080029900.2.
Notice of Allowance dated Feb. 21, 2023 from the Japanese Patent Office in Application No. 2021-518390.
Office Action dated Sep. 13, 2022 issued by the Japanese Patent Office in Japanese Application No. 2021-518390.
Office Action issued Jan. 7, 2025 in Chinese Patent Application No. 202080029900.2.

* cited by examiner

CELL EVALUATION DEVICE

TECHNICAL FIELD

The present invention relates to a cell evaluation device.

BACKGROUND ART

Conventionally, a method for noninvasively evaluating cultured cells has been known in which a culture supernatant of cultured cells is collected and the components of the culture supernatant are analyzed. For example, the differentiation state of cultured cells can be evaluated by adding a growth factor to a culture medium of the cultured cells, which are stem cells, to induce differentiation, and then measuring the amount of a predetermined compound (specifically, a compound whose amount in the culture supernatant is known to change between the differentiated state and the undifferentiated state) in the culture supernatant. Moreover, the resistance, sensitivity, metabolic capacity, or the like of cultured cells to a drug can be evaluated by adding a predetermined drug to a culture medium of a predetermined cultured cell and then quantitatively analyzing components contained in the culture supernatant at a predetermined timing. Hereinafter, a structure in which cells to be evaluated in the evaluation of such cultured cells are housed will be referred to as a cell evaluation device.

When such cultured cells are evaluated, it is necessary to inoculate target cells in the cell evaluation device and then culture the cells in the cell evaluation device over a predetermined period. During culture, waste products accumulate in the culture medium (culture solution) in the cell evaluation device over time, and thus it is necessary to periodically refresh the culture medium. When the culture medium is refreshed, it is necessary to move the cell evaluation device to a sterile environment, remove the old culture medium from the cell evaluation device under the sterile environment, and add a new culture medium into the cell evaluation device.

Patent Literature 1 describes an adapter for enabling automatic refreshment of a culture medium by attaching the adapter to a culture vessel (such as a petri dish or a well of a multi-hole plate) in order to save time and effort for refreshment of the culture medium in cell culture. This adapter is used after being fitted into a top opening of a culture vessel, and includes a culture medium inlet port through which a culture medium is put into the culture vessel, and a culture medium outlet port through which a culture medium in the culture vessel is put out. A tapered face is formed on at least a part of an outer periphery of the adapter, so that the adapter can be easily fitted into the culture vessel by causing the tapered face to slide along the inner face of the culture vessel, and the elastically deformed adapter can be easily held in the culture vessel. Furthermore, by setting the angle of the tapered face with respect to the axis of the adapter to an appropriate value, a gap is less likely to be generated between the tapered face and the inner face of the culture vessel, and it becomes possible to suppress entry of the culture medium into the gap.

The culture medium inlet port of the adapter is connected with a first pipe connected to a culture medium supply unit, and a new culture medium is automatically supplied into the culture vessel through the first pipe. On the other hand, the culture medium outlet port of the adapter is connected with a second pipe connected to a waste liquid reservoir, and a culture medium discharged from the culture vessel with the supply of the new culture medium is discharged to the waste liquid reservoir through the second pipe.

Accordingly, it is possible to save time and effort for culture medium refreshment and reduce a burden on an operator for evaluating the cultured cells by applying such an adapter to the cell evaluation device described above.

CITATION LIST

Patent Literature

Patent Literature 1: JP 3196673 U

Technical Problem

However, in the adapter described in Patent Literature 1, particularly in a case where the size of the culture vessel is small, there is a possibility that sealing of a space between the inner peripheral face of the culture vessel and the outer peripheral face of the adapter becomes insufficient due to dimensional errors of the culture vessel and the adapter, and leakage of the culture medium may occur.

The present invention has been made in view of the above problems, and an object of the invention is to reliably prevent leakage of a culture medium in a cell evaluation device including an adapter having a configuration described above.

Solution to Problem

A cell evaluation device according to the present invention, which has been made to solve one or more of the above problems, includes:
  a concave cell housing unit having a circular bottom face and a side face defining a circular top opening; and
  an adapter configured to be elastically deformed by being fitted into the cell housing unit to close the top opening, and
  the adapter includes:
  a body which has a circular lower end and is configured to be inserted into the cell housing unit;
  a positioning unit configured to position the body in a vertical direction with respect to the cell housing unit;
  a culture medium inlet port which has a through hole penetrating a top end and the lower end of the body;
  a culture medium outlet port which has a through hole penetrating a top end and the lower end of the body; and
  a flexible sheet member which is provided on the lower end of the body and extends radially outward from an outer edge of the lower end.

Advantageous Effects of Invention

According to a cell evaluation device according to the present invention, when the adapter is fitted into the cell housing unit, the sheet member provided on the lower end of the body is to abut on the inner peripheral face of the cell housing unit and is bent upward, and the outer peripheral part of the sheet member is brought into close contact with the inner peripheral face of the cell housing unit. As a result, the space between the adapter and the cell housing unit is sealed, and it becomes possible to prevent the culture medium in the cell housing unit from leaking to the outside.

DESCRIPTION OF EMBODIMENTS

First Embodiment

The following description will explain a cell evaluation device according to a first embodiment of the present invention with reference to FIGS. 1 to 5.

Figure 1:
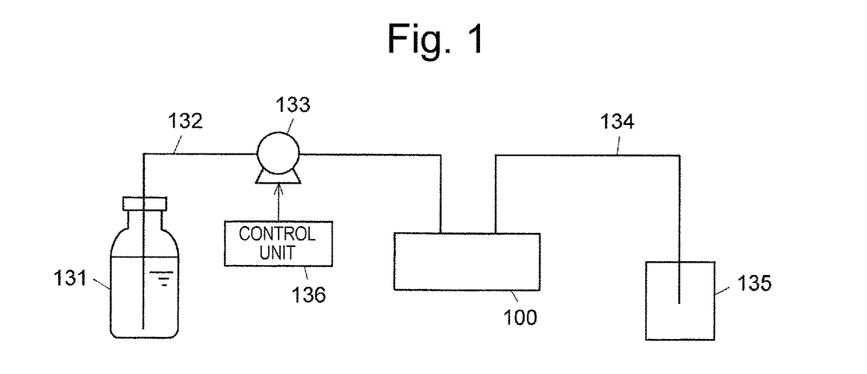
FIG. 1 is a schematic configuration diagram of a cell culture system including a cell evaluation device according to a first embodiment of the present invention.

FIG. 1 is a schematic configuration diagram of a cell culture system including a cell evaluation device 100 according to the present embodiment. In this cell culture system, a liquid feeding pump 133 supplies a liquid medium (which will be hereinafter simply referred to as a culture medium) in a culture medium storage container 131 into the cell evaluation device 100 through first pipe 132, so that a culture medium pushed out of the cell evaluation device 100 accordingly is housed in a culture medium collecting unit 135 through second pipe 134. The operation of the liquid feeding pump 133 is controlled by a control unit 136 including, for example, a personal computer, a programmable logic controller (PLC), or the like.

Figure 2:
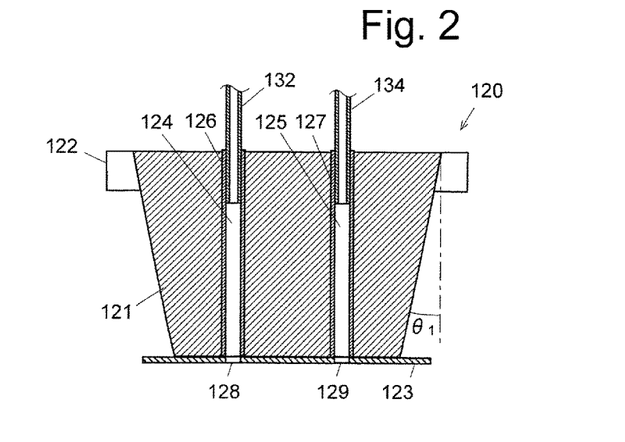
FIG. 2 is a cross-sectional view illustrating a state of the cell evaluation device before an adapter is inserted into a multi-hole plate.
Figure 3:
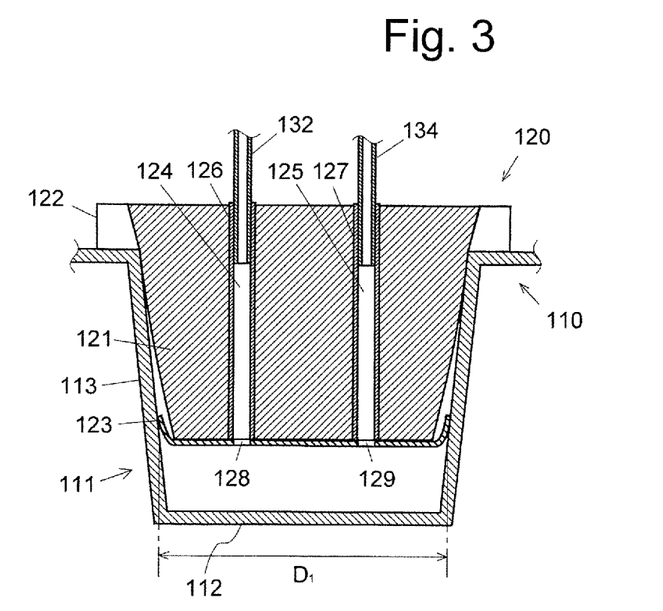
FIG. 3 is a cross-sectional view illustrating a state of the cell evaluation device after an adapter is inserted into a multi-hole plate.

The cell evaluation device 100 includes a multi-hole plate 110, which is also an example of a cell housing plate according to an embodiment of the present invention, and an adapter 120 to be attached to one well 111 (which is an example of a cell housing unit according to an embodiment of the present invention) among a plurality of wells provided in the multi-hole plate 110. FIGS. 2 and 3 illustrate cross-sectional views of the multi-hole plate 110 and the adapter 120. FIG. 2 illustrates a state before the adapter 120 is attached to the well 111, and FIG. 3 illustrates a state after the adapter 120 is attached to the well 111. The well 111 is a recess having a circular bottom face 112 and a side face 113 defining a circular top opening, and the adapter 120 is attached to the well 111 by being fitted into the top opening of this well 111.

Figure 4:
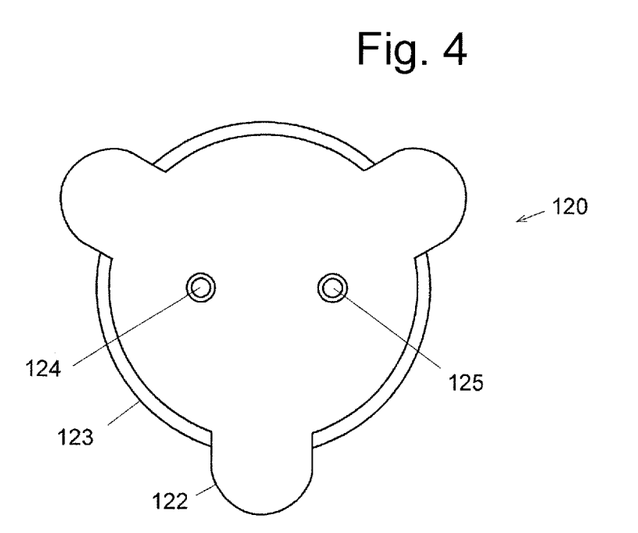
FIG. 4 is a plan view of the adapter.
Figure 5:
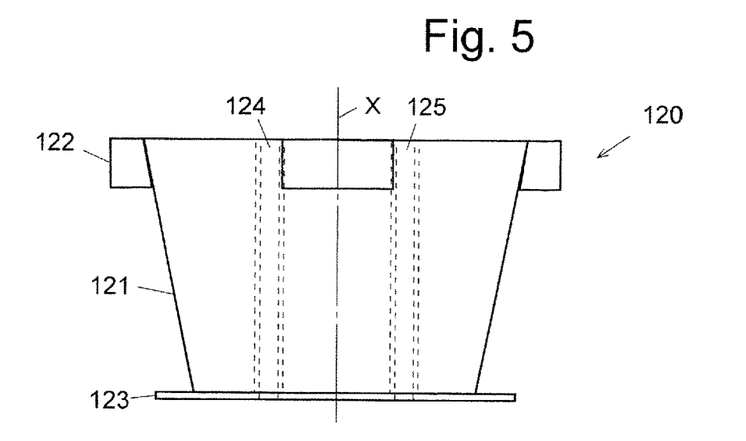
FIG. 5 is a front view of the adapter.

FIG. 4 illustrates a plan view of the adapter 120, and FIG. 5 illustrates a front view of the adapter 120. The adapter 120 includes a truncated cone-shaped body 121 having a diameter decreasing downward, three retaining units 122 protruding from an upper outer peripheral face of the body 121 at equal angular intervals in a radial direction (horizontal direction), and a circular sheet member 123 attached to a lower end of the body 121. In the sheet member 123, a part in contact with the lower end of the body 121 is an example of a central portion according to an embodiment of the present invention, and a part located at an outer position than the outer edge of the lower end of the body 121 is an example of a flange portion according to an embodiment of the present invention.

In the embodiment, the number of the retaining units 122 is not limited to three, and may be two, or four or more. Alternatively, a single retaining unit 122 formed in a flange shape may also be provided.

In the adapter 120, at least the body 121 and the sheet member 123 are made of a material (elastic body) having elasticity. Although the retaining unit 122 is not necessarily made of an elastic body, it is desirable that the entire adapter 120 is made of the same material (accordingly, an elastic body) so as to facilitate manufacturing. For example, polydimethylsiloxane (PDMS) can be used as the elastic body. Since PDMS is a material having gas permeability, when at least the body 121 and the sheet member 123 are made of PDMS, gas exchange can be performed between the inside and the outside of the well 111 even in a state where the body 121 and the sheet member 123 are fitted into the well 111. In a case where the entire adapter 120 is made of PDMS, the adapter 120 can be sterilized by the autoclave and used repeatedly, so that the running cost can be suppressed. The elastic body is not limited to PDMS, and may be any elastomer such as silicone rubber, for example.

As described above, since the body 121 of the adapter 120 has a truncated cone shape having a diameter decreasing downward, the outer peripheral face of the body 121 forms a tapered face inclined with respect to a central axis X of the body 121. Furthermore, the lower end of the body 121 has a diameter smaller than the top opening of the well 111, and the upper face of the body 121 has a diameter larger than the top opening of the well 111. Therefore, by inserting the adapter 120 into the well 111 with the outer peripheral face of the body 121 of the adapter 120 moved along the inner face of the well 111, the body 121 of the adapter 120 can be easily fitted into the well 111, and the body 121 can be elastically deformed to fix the body 121 to the well 111 by the elastic force. The distance from the central axis X of the body 121 of the adapter 120 to the tip of each retaining unit 122 is larger than the radius of the top opening of the well 111. Therefore, when the body 121 of the adapter 120 is fitted into the well 111, the lower end (lower face) of each retaining unit 122 abuts on the upper end of the side face 113 of the well 111 (peripheral edge of the top opening of the well 111), so that the positional relationship between the bottom face of the well 111 and the lower face of the adapter 120 can be kept constant (that is, the depth of the culture medium in the well 111 is defined). In the present embodiment, the retaining unit 122 corresponds to a positioning unit in the present invention.

Furthermore, two through holes extending from the upper face to the lower face of the body 121 are formed in the body 121 of the adapter 120. Hereinafter, one through hole will be referred to as a culture medium inlet port 124, and the other through hole will be referred to as a culture medium outlet port 125. An upper end of the culture medium inlet port 124 is connected with the first pipe 132 connected to the culture medium storage container 131 via the liquid feeding pump 133, and an upper end of the culture medium outlet port 125 is connected with the second pipe 134 leading to the culture medium collecting unit 135. In the sheet member 123, an inlet hole 128 and an outlet hole 129 are formed respectively at positions corresponding to the lower end of the culture medium inlet port 124 and the lower end of the culture medium outlet port 125.

As illustrated in FIG. 3, the diameter of the sheet member 123 is larger than the inner diameter Di of the well 111 at the height corresponding to the lower end of the body 121 when the body 121 of the adapter 120 is inserted into the well 111 until the lower end (lower face) of the retaining unit 122 abuts on the peripheral edge (upper end of the side face 113) of the top opening of the well 111. Although it is preferable that the diameter of the sheet member 123 is 1.2 times or less the inner diameter Di, the present invention is not limited to this. Although it is preferable that the thickness of the sheet member 123 is approximately 0.05 mm to 0.5 mm, the present invention is not limited to such values.

As illustrated in FIG. 3, when the body 121 of the adapter 120 is fitted into the well 111, the outer peripheral part of the sheet member 123 abuts on the inner peripheral face of the well 111, is bent upward, and is brought into close contact with the inner peripheral face. Since this outer peripheral part plays a role like an O-ring to seal the space between the adapter 120 and the well 111, it is possible with the cell evaluation device 100 according to the present embodiment to prevent the culture medium housed in the well 111 from leaking to the outside.

Although the inner peripheral face of the well 111 may be a vertical face or a tapered face, in a case where the inner peripheral face is a tapered face, the inclination angle $\theta_2$ of the tapered face with respect to the central axis (not shown) of the well 111 is set to be smaller than the inclination angle $\theta_1$ of the tapered face of the body 121 of the adapter 120 with respect to the central axis X of the body 121.

The adapter 120 described above can be produced by, for example, pouring liquid PDMS into a mold and curing the PDMS. The culture medium inlet port 124 and the culture medium outlet port 125 can be formed by previously setting tubes 126 and 127 made of silicone rubber or the like in the mold before pouring the PDMS.

A procedure for culturing and evaluating cells using the above cell culture system including such a cell evaluation device 100 will be described. First, an appropriate amount of culture medium is put into the well 111 under a sterile environment, and the target cells are inoculated in the culture medium. Then, after the adapter 120 is attached to the well 111, the multi-hole plate 110 is moved to an incubator (thermostatic chamber) to start cell culture. At this time, the culture medium inlet port 124 and the culture medium outlet port 125 are respectively connected with the first pipe 132 and the second pipe 134, and the culture medium in the culture medium storage container 131 is fed to the culture medium inlet port 124 by operating the liquid feeding pump 133 under the control of the control unit 136. As a result, a new culture medium is supplied to the well 111, and the culture medium in the well 111 is swept away and fed from the culture medium outlet port 125 to the culture medium collecting unit 135 through the second pipe 134. As described above, according to a cell culture system including the cell evaluation device 100 of the present embodiment, since the culture medium in the cell evaluation device 100 is automatically refreshed, it is possible to save time and effort for manual refreshment of the culture medium. Such culture medium refreshment may be performed continuously by constantly driving the liquid feeding pump 133, or may be performed intermittently by driving the liquid feeding pump 133 at regular time intervals.

After a predetermined period has elapsed from the start of the cell culture, a growth factor, a predetermined drug, or the like is added to the well 111 as necessary, and then the culture medium, that is, the culture supernatant is collected from the culture medium collecting unit 135 at a predetermined timing. The collected culture supernatant is subjected to analysis using a mass spectrometer, a liquid chromatograph, a gas chromatograph, or the like, and the cultured cells are evaluated on the basis of the result of the analysis. Specifically, for example, the differentiation state of stem cells can be evaluated by culturing stem cells in the well 111, then adding a growth factor to the well 111 to induce the differentiation of the stem cells, then collecting and analyzing the culture supernatant, and finding the abundance of a predetermined compound in the culture supernatant. Alternatively, the sensitivity, resistance, metabolic capacity, or the like of a cell to a drug can be evaluated by culturing a predetermined cell in the well 111, then adding a predetermined drug to the well 111, and then collecting a culture supernatant and analyzing components in the culture supernatant.

Second Embodiment

Figure 6:
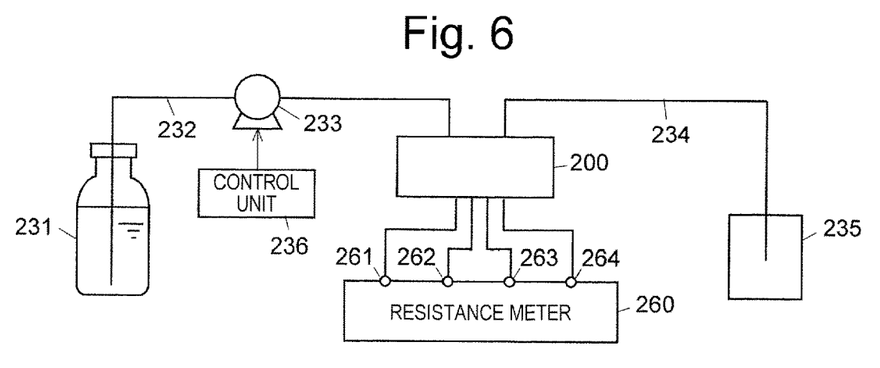
FIG. 6 is a schematic configuration diagram of a cell culture system including a cell evaluation device according to a second embodiment of the present invention.
Figure 7:
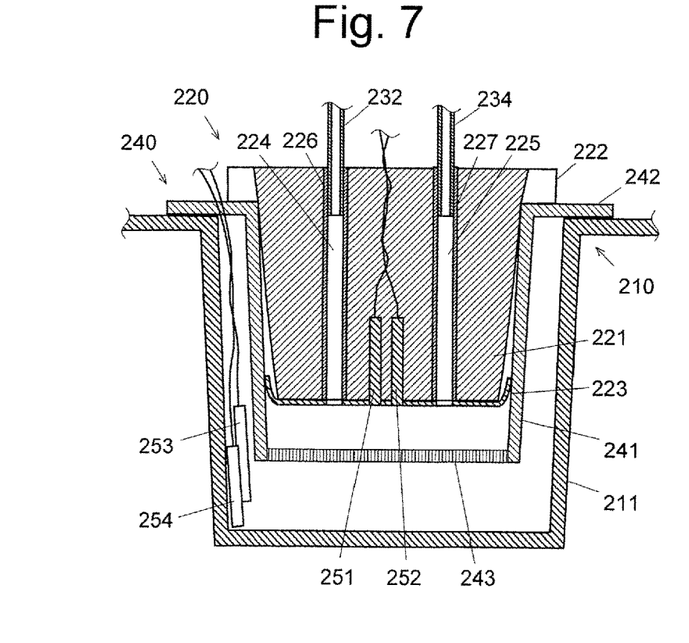
FIG. 7 is a cross-sectional view of a multi-hole plate, an insert, and an adapter in the cell evaluation device.

The following description will explain a second embodiment of the present invention with reference to FIGS. 6 and 7. The same or corresponding components as those described in First Embodiment are denoted by the same reference numerals in the last two digits, and the description of such components is appropriately omitted.

FIG. 6 is a schematic configuration diagram of a cell culture system including a cell evaluation device 200 according to the present embodiment. This cell culture system includes a resistance meter 260 (details will be described later) in addition to the same configuration as that in First Embodiment. The cell evaluation device 200 according to the present embodiment includes a multi-hole plate 210 and a cell culture insert (which will be hereinafter simply referred to as an insert 240). FIG. 7 illustrates a cross-sectional view of the multi-hole plate 210, the insert 240, and an adapter 220 in the present embodiment.

The insert 240 includes a truncated cone-shaped body portion 241 (which is an example of a cell housing unit according to an embodiment of the present invention) having a diameter decreasing downward, and a plurality of retaining units 242 which are provided at an upper portion of the body portion 241 and protrude radially from an outer periphery of the body portion 241. The bottom face of the body portion 241 is made of a porous film 243. This insert 240 is used in a state where the body portion 241 is positioned in a well 211 (which is an example of a recess according to an embodiment of the present invention) of the multi-hole plate 210 (which is an example of a culture vessel according to an embodiment of the present invention), and the retaining units 242 are retained to the upper face of the outer peripheral edge of the well 211, that is, the body portion 241 is suspended inside the well 211. Since a large number of minute through holes having an inner diameter of approximately 0.1 um to 10 um are formed in the porous film 243 constituting the bottom face of the insert 240, a substance (a drug, a nutrient, oxygen, or the like) can move between the inside of the well 211 and the inside of the insert 240 through the porous film 243.

The adapter 220 in the present embodiment is to be used after fitting a body 221 of the adapter into the top opening of the insert 240, and includes a pair of electrodes (which will be referred to respectively as a first internal electrode 251 and a second internal electrode 252) contained in the body 221, in addition to a culture medium inlet port 224, a culture medium outlet port 225, a retaining unit 222, and a sheet member 223 similar to those in First Embodiment.

Furthermore, the cell evaluation device 200 according to the present embodiment includes a pair of external electrodes (which will be referred to respectively as a first external electrode 253 and a second external electrode 254) arranged in the well 211 of the multi-hole plate 210 (that is, between the inner peripheral face of the well 211 and the outer peripheral face of the insert 240). The first internal electrode 251 and the first external electrode 253 are connected with current supply terminals 261 and 264 of the resistance meter 260, and the second internal electrode 252 and the second external electrode 254 are connected with voltage measurement terminals 262 and 263 of the resistance meter 260. Each of these electrodes 251, 252, 253, and 254 corresponds to each terminal of a chopstick type electrode, and the first internal electrode 251 and the second internal electrode 252 are embedded in the adapter 220 with the end faces of the internal electrodes exposed to the lower face of the adapter 220 (that is, the lower end of the body 221). The adapter 220 in the present embodiment is made of a material having elasticity and no conductivity. For example, PDMS can be suitably used as such a material.

The cell evaluation device 200 in the present embodiment can be suitably used for culturing and evaluating cells (e.g., intestinal epithelial cells) having a property of forming tight junctions between cells. When this cell evaluation device 200 cultures cells, a first culture solution and the target cells are housed in the insert 240, and a second culture solution is housed in the well 211 (strictly speaking, between the well 211 and the insert 240).

While cell culture is performed using the above cell culture system including such a cell evaluation device 200, a culture medium in a culture medium storage container 231 sucked by a liquid feeding pump 233 is supplied to the inside of the insert 240 through first pipe 232, and a culture medium swept away from the inside of the insert 240 accordingly is housed in a culture medium collecting unit 235 through second pipe 234. Accordingly, also in the present embodiment, the refreshment of the culture medium in the insert 240 can be automatically performed.

After the start of the cell culture, the electric resistance is periodically or constantly measured using the resistance meter 260 to check the formation state of tight junctions between cells in the insert 240. Specifically, the resistance meter 260 supplies a constant current across the first internal electrode 251 and the first external electrode 253, so as to measure the voltage generated between the second internal electrode 252 and the second external electrode 254. The resistance meter 260 finds a resistance value from the value of the supplied current and the value of the measured voltage, and displays the resistance value on a display unit (not shown) provided in the resistance meter 260. The electric resistance found in such a manner includes the electric resistance of the porous film 243 constituting the bottom face of the insert 240, and the electric resistance of the cells cultured on the porous film 243. Among them, the electric resistance of the porous film 243 is constant, while the electric resistance of cells increases as the number of tight junctions formed between cells increases after the start of culture. Therefore, the value of the electric resistance measured by the resistance meter 260 gradually increases, and when sufficient tight junctions are formed between cells, the electric resistance does not increase any more. Accordingly, it can be determined that sufficient tight junctions have been formed between cells by checking that the measured value of the electric resistance by the resistance meter 260 becomes substantially constant.

After it is checked that sufficient tight junctions have been formed between cells as described above, the sensitivity, resistance, permeability, metabolic capacity, or the like of cells to the substance is evaluated by putting in a culture solution containing a predetermined substance instead of the first culture solution or the second culture solution, and observing changes in the cells, or collecting a culture supernatant in the insert 240 or a culture medium in the well 211 and analyzing components of the culture supernatant or the culture medium.

The cell evaluation device 200 according to the present embodiment may include terminals of sheet type electrodes instead of the chopstick type electrodes 251, 252, 253, and 254. Although the above example has illustrated a configuration in which the electric resistance is measured using a four-terminal measurement method, a cell evaluation device according to the present embodiment may measure the electric resistance using a two-terminal measurement method. In this case, a single electrode is each disposed inside the adapter 220 and between the well 211 and the insert 240 instead of the pair of electrodes.

Moreover, the adapter 120 having no internal electrode as illustrated in FIGS. 2 and 3 may be applied to the combination of the multi-hole plate 210 (in a state where no external electrode is housed) and the insert 240 described above. In this case, although the electric resistance of the cells cannot be measured, a nutrient, oxygen, a drug, or the like can be moved between the inside of the insert 240 and the inside of the well 211 through the porous film 243 constituting the bottom face of the insert 240 as described above, and thus the cells can be cultured and evaluated under various conditions.

Although the retaining units 122 and 222 are provided in the upper portions of the bodies 121 and 221 of the adapters 120 and 220 in both the first and second embodiments, such a retaining unit may not necessarily be provided. Even in a case where a retaining unit is not provided, it is possible to keep the positional relationship between the bottom face of the cell housing unit and the lower end of the body of the adapter substantially constant when the body of the adapter is inserted into the cell housing unit, by defining an inclination angle (corresponding to the angle $\theta_1$ in FIG. 2) of the peripheral face (tapered face) of the body with respect to the central axis X of the body of the adapter such that the lower end of the body stays at a position higher than the bottom face of the cell housing unit. That is, in this case, the peripheral face of the body of the adapter corresponds to the positioning unit in the present invention.

Although the circular sheet members 123 and 223 are attached to the lower ends of the bodies 121 and 221 of the adapters 120 and 220 in the first and second embodiments, an annular sheet member may be attached to the outer edge of the lower end of the body 121 or 221 instead.

The above description has explained embodiments of the present invention in detail with reference to the accompanying drawings. Finally, various aspects of the present invention will be described.

A cell evaluation device according to a first aspect of the present invention includes:
   a concave cell housing unit having a circular bottom face and a side face defining a circular top opening; and
   an adapter configured to be elastically deformed by being fitted into the cell housing unit to close the top opening, and
   the adapter includes:
   a body which has a circular lower end and is configured to be inserted into the cell housing unit;
   a positioning unit configured to position the body in a vertical direction with respect to the cell housing unit;
   a culture medium inlet port which has a through hole penetrating a top end and the lower end of the body;
   a culture medium outlet port which has a through hole penetrating a top end and the lower end of the body; and
   a flexible sheet member which is provided on the lower end of the body and extends radially outward from an outer edge of the lower end.

According to the cell evaluation device of the first aspect, when the adapter is fitted into the cell housing unit, the sheet member abuts on the inner peripheral face of the cell housing unit and is bent upward, and the outer peripheral part of the sheet member is brought into close contact with the inner peripheral face of the cell housing unit. As a result, the space between the adapter and the cell housing unit is sealed, and it becomes possible to prevent the culture medium housed in the cell housing unit from leaking to the outside.

A second aspect of the present invention is the cell evaluation device according to the first aspect,
in which an outer diameter of the sheet member is larger than an inner diameter of the cell housing unit at a height corresponding to the lower end of the body with the body of the adapter being inserted into the cell housing unit and being positioned in the vertical direction by the positioning unit.

A third aspect of the present invention is the cell evaluation device according to the first or second aspect,
in which the positioning unit is a retaining unit protruding in a horizontal direction from the adapter, and
a lower end of the retaining unit abuts on a peripheral edge of the top opening of the cell housing unit with the body being inserted into the cell housing unit.

According to the cell evaluation device of the third aspect, when the body of the adapter is inserted into the cell housing unit, the lower end of the retaining unit abuts on the peripheral edge of the top opening of the cell housing unit, so that the positional relationship between the bottom face of the cell housing unit and the lower end of the body of the adapter can be kept constant.

A fourth aspect of the present invention is the cell evaluation device according to any one of the first to third aspects, including
a cell housing plate in which a plurality of the cell housing units is formed.

According to the cell evaluation device of the fourth aspect, cell culture and evaluation of a plurality of samples can be collectively performed on one cell housing plate.

A fifth aspect of the present invention is the cell evaluation device according to any one of the first to fourth aspects, further including
a culture vessel having a recess in which a culture medium is housed,
in which the cell housing unit is configured to be detachably attached in the recess, and the bottom face of the cell housing unit is made of a porous film.

According to the cell evaluation device of the fifth aspect, since a substance (a drug, a nutrient, oxygen, or the like) can move between the recess and the cell housing unit through the porous film, cells can be cultured and evaluated under various conditions.

A sixth aspect of the present invention is the cell evaluation device according to the fifth aspect,
in which the culture vessel is a multi-hole plate.

According to the cell evaluation device of the sixth aspect, cell culture and evaluation of a plurality of samples can be collectively performed on one multi-hole plate.

A seventh aspect of the present invention is the cell evaluation device according to any one of the first to sixth aspects,
in which the sheet member includes a circular central portion attached to the lower end of the body, a flange portion protruding radially outward from an outer edge of the central portion, and an inlet hole and an outlet hole respectively formed at positions corresponding to a lower end of the culture medium inlet port and a lower end of the culture medium outlet port in the central portion.

According to the cell evaluation device of the seventh aspect, the sheet member can be easily and reliably attached to the lower end of the body of the adapter.

An eighth aspect of the present invention is the cell evaluation device according to the fifth or sixth aspect,
further including:
an internal electrode which is embedded in the adapter and has a part exposed onto a lower end of the adapter; and
an external electrode housed in the recess.

According to the cell evaluation device of the eighth aspect, the electric resistance of cells cultured on the porous film can be measured by connecting the internal electrode and the external electrode with a resistance meter.

REFERENCE SIGNS LIST 100, 200 . . . Cell Evaluation Device
110, 210 . . . Multi-hole Plate
111, 211 . . . Well
112 . . . Bottom Face
113 . . . Side Face
120, 220 . . . Adapter
121, 221 . . . Body
122, 222 . . . Retaining Unit
123, 223 . . . Sheet Member
124, 224 . . . Culture Medium Inlet Port
125, 225 . . . Culture Medium Outlet Port
128 . . . Inlet Hole
129 . . . Outlet Hole
240 . . . Insert
241 . . . Body Portion
242 . . . Retaining Unit
243 . . . Porous Film
251 . . . First Internal Electrode
252 . . . Second Internal Electrode
253 . . . First External Electrode
254 . . . Second External Electrode
131, 231 . . . Culture Medium Storage Container
133, 233 . . . Liquid Feeding Pump
135, 235 . . . Culture Medium Collecting Unit
260 . . . Resistance Meter

The invention claimed is:
1. A cell evaluation device comprising:
a cell housing unit having a circular bottom face and a side face, the side face defining a circular top opening; and
an adapter configured to be elastically deformed by being fitted into the cell housing unit to close the top opening, wherein the adapter includes:
a body which has a circular lower end and is configured to be inserted into the cell housing unit;
a positioning unit, which is configured to position the body in a vertical direction with respect to the cell housing unit, and is a tapered peripheral face of the body or a retaining unit protruding in a horizontal direction from the body;
a culture medium inlet port which has a through hole penetrating a top end and the lower end of the body;
a culture medium outlet port which has a through hole penetrating the top end and the lower end of the body; and a flexible sheet member which is provided on the lower end of the body and extends radially outward from an outer edge of the lower end, wherein an outer diameter of the sheet member is larger than an inner diameter of the cell housing unit at a height corresponding to the lower end of the body with the body of the adapter being inserted into the cell housing unit and being positioned in a vertical direction by the positioning unit, wherein the side face of the cell housing unit and a side face of the body of the adaptor are each tapered, and wherein an inclination angle of the side face of the cell housing unit with respect to a central axis of the cell housing unit is less than an inclination angle of the side face of the body of the adapter with respect to the central axis of the body;

wherein the sheet member includes a circular central portion attached to the lower end of the body, a flange portion protruding radially outward from an outer edge of the central portion, and an inlet hole and an outlet hole respectively formed at positions corresponding to a lower end of the culture medium inlet port and a lower end of the culture medium outlet port in the central portion.

2. The cell evaluation device according to claim 1, wherein:
the positioning unit is a retaining unit protruding in a horizontal direction from the adapter; and
a lower end of the retaining unit abuts on a peripheral edge of the top opening of the cell housing unit with the body being inserted into the cell housing unit.

3. The cell evaluation device according to claim 1, comprising a cell housing plate in which a plurality of the cell housing units is formed.

4. The cell evaluation device according to claim 1, further comprising
a culture vessel including a recess in which a culture medium is to be housed,
wherein the cell housing unit is configured to be detachably attached in the recess, and the bottom face of the cell housing unit is made of a porous film.

5. The cell evaluation device according to claim 4, wherein the culture vessel is a multi-hole plate.

6. The cell evaluation device according to claim 4, further comprising:
an internal electrode which is embedded in the adapter and has a part exposed onto a lower end of the body of the adapter; and
an external electrode housed in the recess.

* * * * *